United States Patent
Brugger et al.

(10) Patent No.: US 7,133,573 B2
(45) Date of Patent: Nov. 7, 2006

(54) DOCUMENT SKEW ACCOMMODATION

(75) Inventors: Charles E. Brugger, Rochester, NY (US); John J. Alescio, Penfield, NY (US)

(73) Assignee: Eastman Kodak Company, Rochester, NY (US)

(*) Notice: Subject to any disclaimer, the term of this patent is extended or adjusted under 35 U.S.C. 154(b) by 896 days.

(21) Appl. No.: 10/304,732

(22) Filed: Nov. 26, 2002

(65) Prior Publication Data

US 2004/0101211 A1    May 27, 2004

(51) Int. Cl.
G06K 9/36    (2006.01)
(52) U.S. Cl. ............ 382/289; 358/495; 358/497; 399/395; 400/579; 382/112
(58) Field of Classification Search ............. 382/289
See application file for complete search history.

(56) References Cited

U.S. PATENT DOCUMENTS

| 3,701,098 | A | * | 10/1972 | Acker ................. 382/295 |
| 3,812,459 | A | * | 5/1974 | MacNeill et al. ......... 382/296 |
| 4,338,588 | A | * | 7/1982 | Chevillat et al. ......... 382/290 |
| 4,393,410 | A | * | 7/1983 | Ridge et al. ............ 358/488 |
| 4,437,114 | A | * | 3/1984 | LaRussa ................. 348/94 |
| 4,875,103 | A | * | 10/1989 | Bridges et al. .......... 348/110 |
| 4,934,684 | A | * | 6/1990 | Gysling ................. 271/34 |
| 4,971,304 | A | * | 11/1990 | Lofthus ................. 271/227 |
| 5,001,766 | A | * | 3/1991 | Baird .................. 382/290 |
| 5,172,907 | A | * | 12/1992 | Kalisiak ............... 271/227 |
| 5,181,260 | A | * | 1/1993 | Kurosu et al. ........... 382/289 |
| 5,200,779 | A | * | 4/1993 | Nawata ................. 399/24 |
| 5,227,620 | A | * | 7/1993 | Elder et al. ............ 250/208.1 |
| 5,302,973 | A | * | 4/1994 | Costanza et al. ......... 347/233 |
| 5,313,311 | A | * | 5/1994 | Brandkamp .............. 358/474 |
| 5,375,722 | A | * | 12/1994 | Leary et al. ............ 209/578 |
| 5,453,852 | A | * | 9/1995 | Morikawa et al. ......... 358/498 |
| 5,528,387 | A | * | 6/1996 | Kelly et al. ............ 358/488 |
| 5,615,280 | A | * | 3/1997 | Izawa et al. ............ 382/135 |
| 5,662,321 | A | * | 9/1997 | Borostyan et al. ....... 271/10.03 |
| 5,681,036 | A | * | 10/1997 | Wakahara et al. ........ 271/10.12 |
| 5,796,868 | A | * | 8/1998 | Dutta-Choudhury ........ 382/199 |
| 5,818,976 | A | * | 10/1998 | Pasco et al. ........... 382/289 |
| 5,895,928 | A | * | 4/1999 | Kerschner ............. 250/559.37 |
| 5,901,253 | A | * | 5/1999 | Tretter ................ 382/289 |
| 6,034,784 | A | * | 3/2000 | Gatto et al. ........... 358/1.18 |
| 6,373,997 | B1 | * | 4/2002 | Wayner et al. .......... 382/289 |

FOREIGN PATENT DOCUMENTS

EP    1 158 768 A2    11/2001

* cited by examiner

Primary Examiner—Andrew W. Johns
Assistant Examiner—Sath V. Perungavoor
(74) Attorney, Agent, or Firm—Nelson Adrian Blish (57) ABSTRACT

A method to be used within a document image capture device, such as a document scanner (10) of detecting and measuring the document skew (25) while the document is still entering the imaging area and then effecting a rotation of the camera to accommodate the document skew so that the resulting image taken is not skewed. This can be accomplished by one of several methods, such as rotating the entire camera, rotating only the sensor element, or rotating another element in the optical path such as a prism. Use of the methods incorporated in this invention does not require the document motion to be stopped to measure and accommodate skew or to take the image.

34 Claims, 8 Drawing Sheets

DOCUMENT SKEW ACCOMMODATION

CROSS REFERENCE TO RELATED APPLICATIONS

Reference is made to commonly-assigned co-pending U.S. patent application Ser. No. 09/650,203, filed Aug. 29, 2000, entitled METHOD FOR DETECTION OF SKEW ANGLE AND BORDER OF DOCUMENT IMAGES IN A PRODUCTION SCANNING ENVIRONMENT, by Lee et al., the disclosure of which is incorporated herein.

FIELD OF THE INVENTION

Image recording devices which capture images of documents, photographs, and other objects, which have orthogonal boundaries or other orthogonal features that can be used to determine when the object is oriented properly to the imaging device. These devices include document scanners, pictorial scanners, and reprographic scanners (image acquisition device/system portion of a digital copier.)

BACKGROUND OF THE INVENTION

When documents are transported for scanning using a document feeder, they may become skewed while traveling through the paper path. The skew may be caused by a number of factors, including how the paper was placed in the hopper or how the transport rollers grab the leading edge of the paper to move it. Skew may also result from manual placement of documents within the scanner if sufficient care or time is not taken.

In the prior art, the image of the misaligned (skewed) document is captured and stored temporarily. Consequently, this image is skewed. The image is then straightened by calculating the angle of skew and manipulating the pixel values that comprise the image. This causes some loss in the sharpness of the image, as well as requiring temporary storage of a skewed image within the image forming device. This invention eliminates this type of de-skewing process.

SUMMARY OF THE INVENTION

Briefly, according to one aspect of the present invention a method for correcting skew angle in a document scanner comprises transporting a document past a camera. A leading edge of the document is detected. A leading edge skew angle of the document is determined based on the leading edge with a first algorithm. The camera is rotated to align it with the document. It is determined if the document is completely within the field of view of the camera, and when it is the skew angle is recalculated based on the entire document using a second algorithm. The camera is rotated to align it with the document and an image of the document is captured.

According to one embodiment of the present invention document skew is detected while the document is still entering the imaging area and then rotate the camera or optical system to accommodate the document skew so that the resulting image taken is not skewed. This can be accomplished by one of several methods, such as rotating the entire camera, the sensor element, or another element in the optical path such as a prism.

An advantage of the present invention is that it does not require the document motion to be stopped to take the image or to measure and accommodate skew.

When the present invention is used for a non-digital image capture device, for example a film camera or optical copier, an auxiliary digital image sensor would be incorporated for determining the skew in the original document. Since used only for determining document skew, this sensor could be simpler and of lower resolution than what would be needed for capturing the final image, and consequently relatively inexpensive.

In a device using this invention the skew can be detected and accommodated as the document enters the imaging area so that the image can be taken without skew error. The image can then immediately be available for transmittal to the host. With the current methods the original (skewed) image must be stored temporarily and then the skew angle must be determined. Then the corrected image must be created from the original image before the image storage space can be used for the next image. This affects the speed at which images can be taken and processed. The impact on process speed is directly related to the size of the image. This method eliminates the loss of sharpness resulting from the prior art methods of image deskew.

The present invention may also be used in non-digital photographic applications such as optical copiers and copy stands, and other auto-feeding devices using film cameras. Although the present invention is limited to use in image recording devices which image an area at one time, typically an entire document, the devices utilizing this invention can compete in a broader field with imaging devices which use other types of cameras in accomplishing the same end, which would be to create an image of a document, picture, etc. For the purpose of this disclosure, the term "document" will be used to represent all possible items that are to be imaged.

DETAILED DESCRIPTION OF THE INVENTION

The present invention will be directed in particular to elements forming part of, or in cooperation more directly with the apparatus in accordance with the present invention.

It is to be understood that elements not specifically shown or described may take various forms well known to those skilled in the art.

Figure 1:
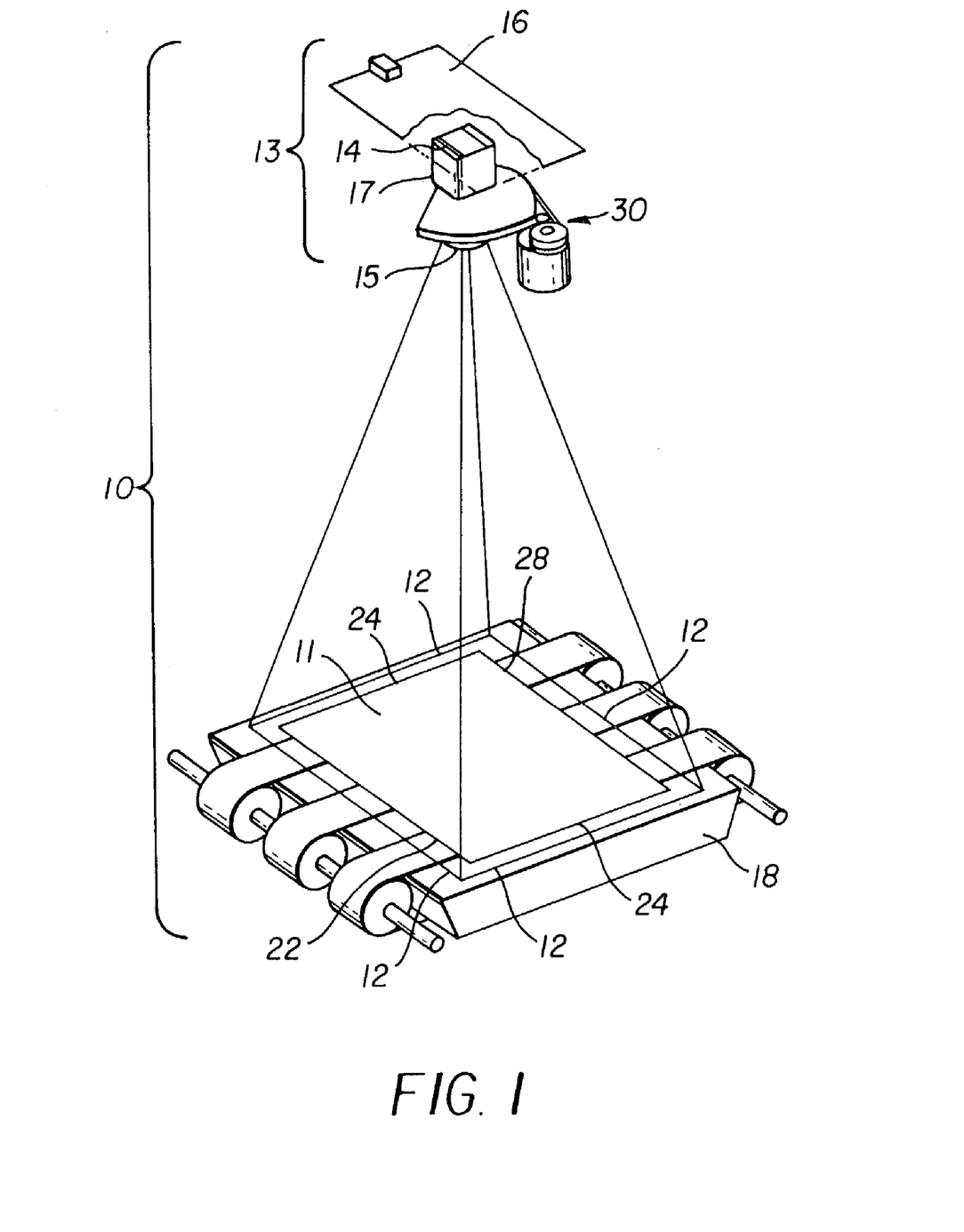
FIG. 1 illustrates a document scanner, in this case an area array scanner, which utilizes mechanical skew accommodation according to the present invention.

Referring now to FIG. 1, one embodiment of this invention is a document scanner 10 which contains one or more digital cameras 13 for capturing images of documents.

Figure 3:
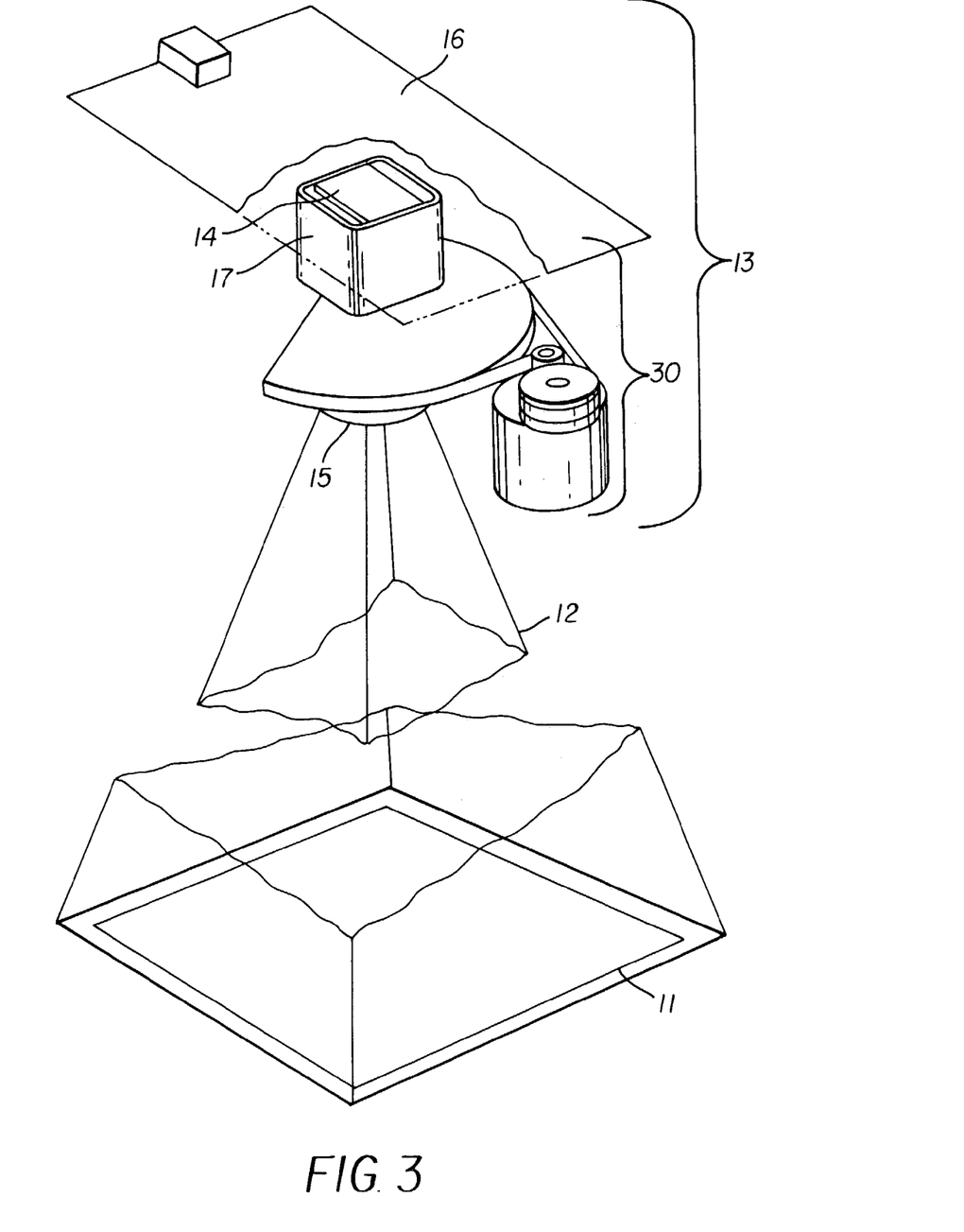
FIG. 3 shows a close-up view of the imaging components and the mechanism for rotating the camera 13.

Referring to FIG. 3, for the purposes of this description a digital camera 13 consists of an imaging sensor 14 which converts the optical image of the documents 11 to an electrical file, and a lens 15 which focuses the image of the documents 11 onto the imaging sensor 14, a circuit board assembly 16 which converts the signal from the imaging sensor to discrete numerical values and provides the image to an image processing system (not shown), and a support means 17 for the imaging sensor 14, the lens 15, and the circuit board assembly 16.

Referring back to FIG. 1 in this scanner, documents 11 are individually picked from an input area, such as an input tray (not shown), and are transported through the field of view 12 of a camera 13. When the document 11 is entirely within the field of view 12 of the camera 13, and without stopping the motion of the document 11, the camera 13 will capture an image of the document 11. The document 11 continues moving out of the field of view 12 through the remainder of the transport means 18 to an output tray or hopper. Documents 11 follow each other through this transport means, in a continuous manner, and are sequentially imaged.

Figure 2:
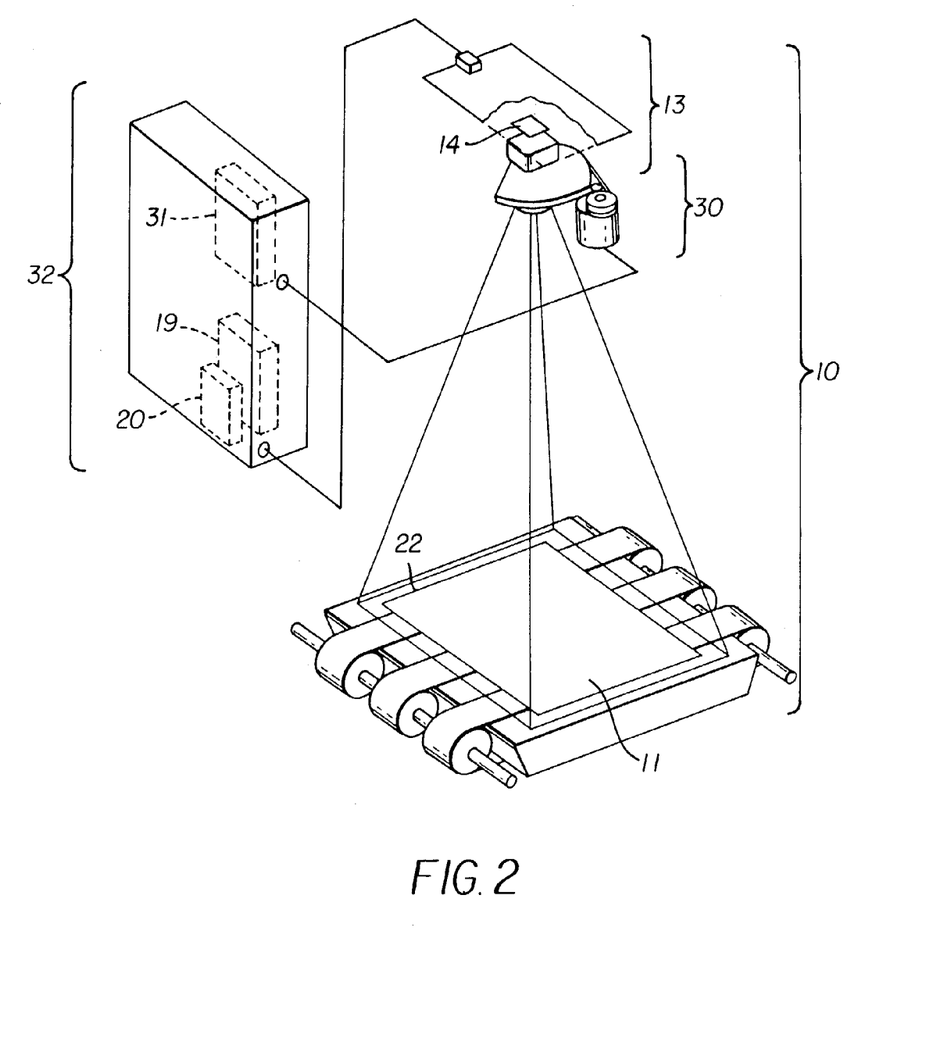
FIG. 2 is a schematic view of the elements of a document scanner according to the present invention.

Referring to FIG. 2 as in most scanners, the imaging sensor 14 is always imaging whenever the system is operating, constantly refreshing the image at regular intervals several times per second. Capturing an image means saving one of these images to an image memory device 19. In the present invention, while the camera 13 is waiting for a document 11 one out of every so many images is saved to a temporary memory device 20 for the purposes of detecting the presence of the leading edge 22 of a document 11 within that image. The entire image would not be saved in this temporary memory, but the image would be sub-sampled. This means that only one out of every so many picture elements (pixels) within the image would actually be saved.

Figure 4A:
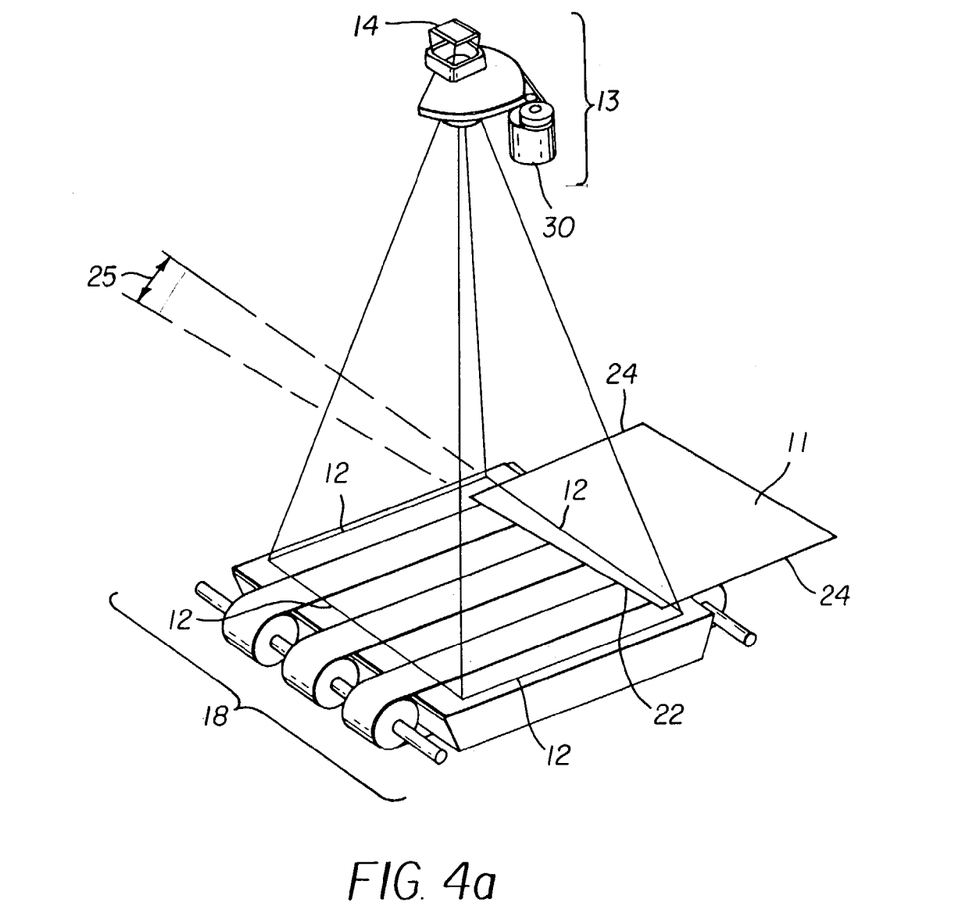
FIG. 4a illustrates a skewed document entering the field-of-view of the camera.
Figure 4B:
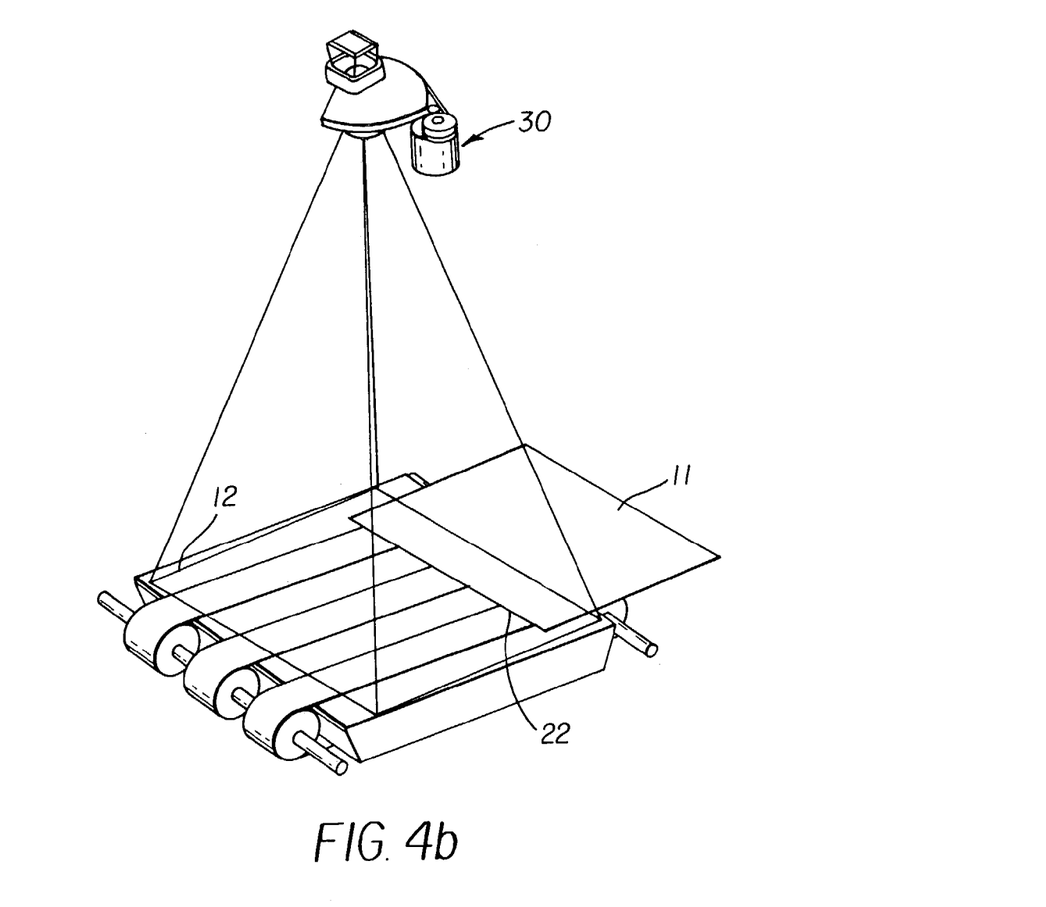
FIG. 4b illustrates rotation of the camera to accommodate the document skew as the document further enters the field of view of the camera.
Figure 4C:
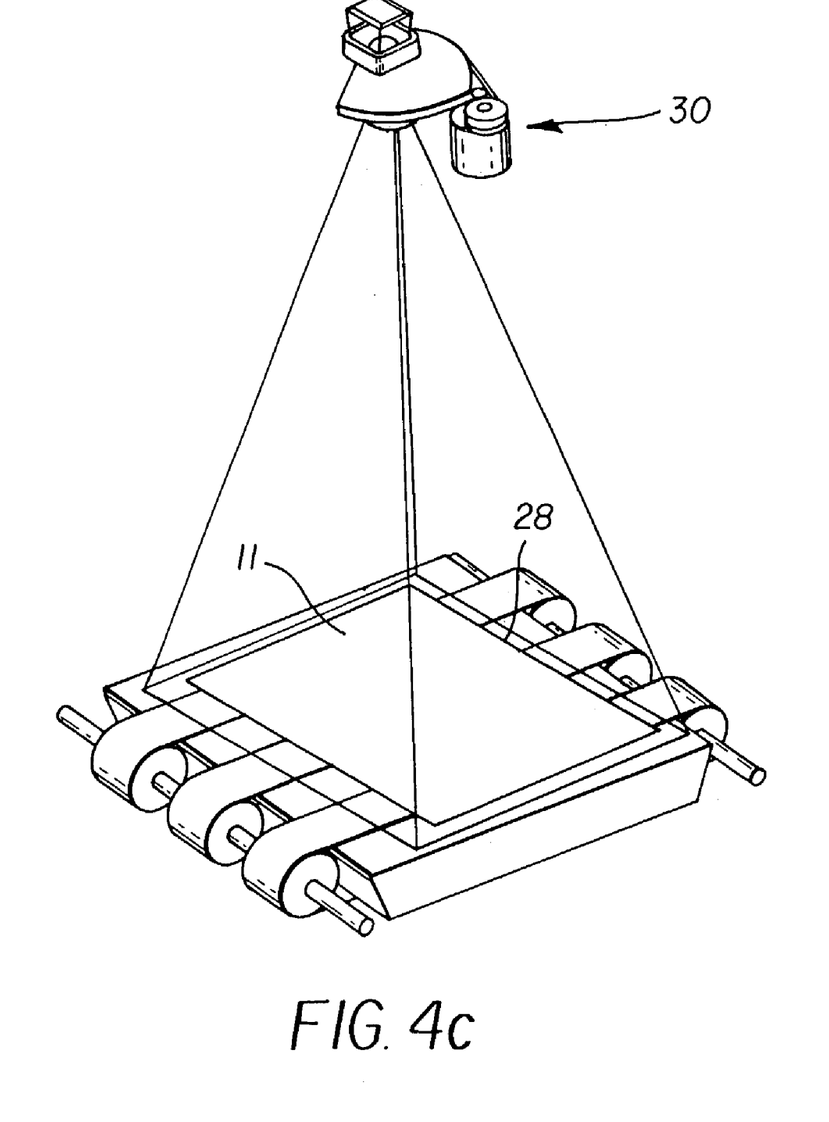
FIG. 4c illustrates the completion of the camera rotation to align the field of view of the camera with the skewed document.

Referring to FIGS. 4a–4c, as the leading edge 22 of the document 11 enters the field of view 12 the subsampled image will contain this edge as well as the leading portions of the side edges 24. A computer algorithm determines the presence of these side edges 24 and also determines the angle of skew 25 of the leading edge 22. Sub-sampled images are used to increase the speed at which the presence of a document and the skew angle 25 can be determined. The scanner can then begin to activate the rotation actuator mechanism 30 to rotate the camera 13 in an appropriate direction to align the imaging sensor 14 with the document 11.

Samples of the image are taken continuously and the skew angle 25 determined. The camera 13 continues to be moved in the appropriate direction until the skew angle 25 is determined to be within an acceptable approach to zero. At that time camera motion is stopped and the scanner continues to process the sub-sampled images until a trailing edge 28 of the document 11 is detected in the image. At that time a more robust skew measuring algorithm, for example, minimum bounding area described in copending U.S. patent application Ser. No. 10/262,049, filed Oct. 1, 2002, can be employed to confirm that the skew angle 25 is within acceptable limits. The camera 13 can be realigned at that time to correct any remaining skew. A final full-resolution image would then be taken and saved to an image memory device 19. See FIG. 2.

Generally, scanning takes place while the document 11 is still moving and would be completed before the document began to exit the field of view 12 of the camera 13. The next document would be imaged in the same manner.

For the exceptional document 11 for which the process cannot be accomplished before the document began to exit the field of view 12 of the camera 13, the transport means 18 would be stopped until the skew angle 25 in the image is within limits and the final image is saved to the image memory device 19. The transport means 18 would then be restarted and the next document 11 would be imaged in the same manner.

Referring again to FIG. 3, this invention includes a digital camera 13 which includes an area imaging sensor 14, which may be a CMOS or a CCD variety. A lens 15 or other optics for focusing the image of the documents onto the imaging sensor. Circuitry for converting the electrical content of the image within the imaging sensor to discrete numerical values (analog to digital conversion) such as the imaging circuit board assembly 16. A support means for the lens and imaging sensor 17 is provided. A support means for the other elements within the camera are not shown. A rotation actuator mechanism 30 rotates the camera in the axis required to accommodate document skew and constrains motion in all other degrees of freedom. A support means holds the actuator mechanism in position to the document transport means (not shown).

Figure 5:
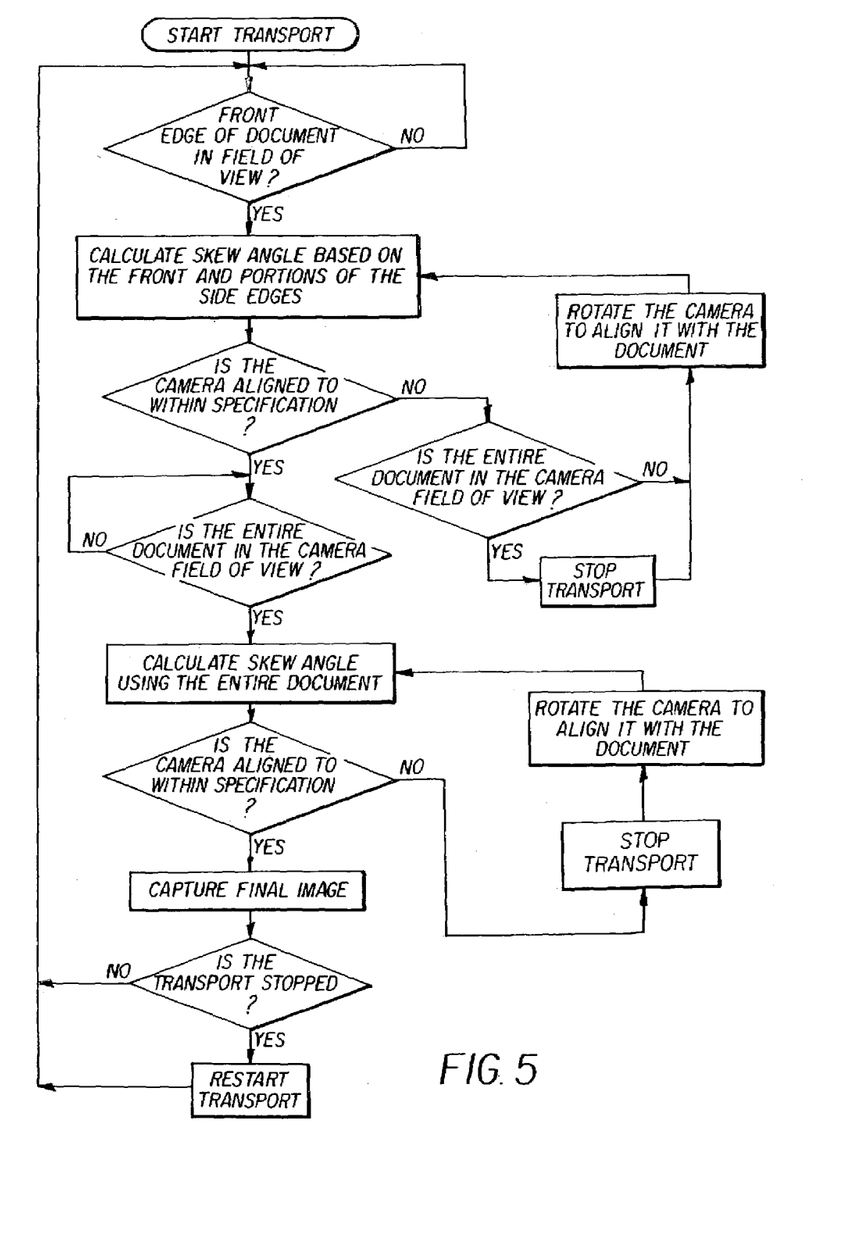
FIG. 5 illustrates the flow diagram for one implementation of the method of skew accommodation used in this invention.

Referring back to FIG. 2 electronic circuitry to control the actuator, such as the actuator control electronics 31. A processing unit 32, such as a microprocessor is used to calculate the skew angle and to control the rotation of the actuator. A temporary memory device 20 is used to store subsampled images for the purpose of determining skew angle. An algorithm for the processing unit to follow in determining the rotation required for accommodating the skew is illustrated in FIG. 5. An image memory device 19 saves the final image of each document.

Figure 6:
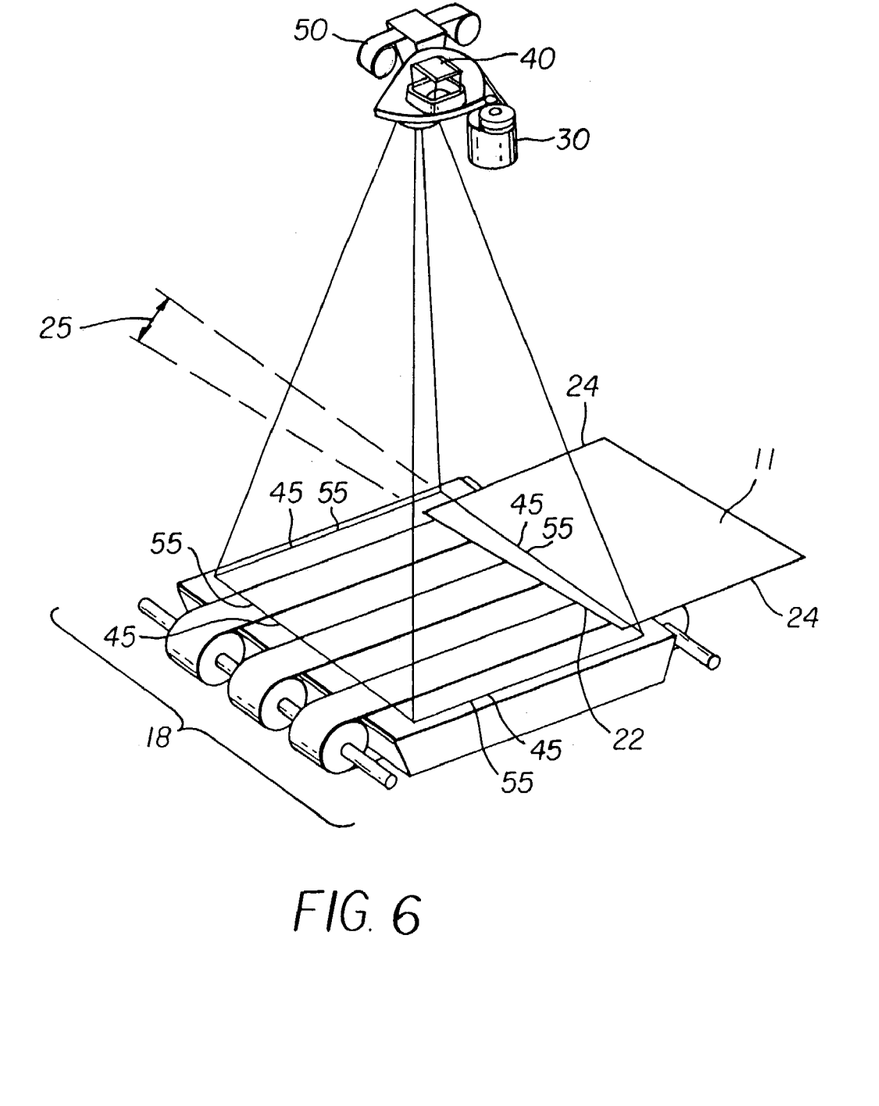
FIG. 6 is a perspective view of an alternate embodiment of the present invention using an angle image capture device and an auxiliary digital image sensor for determining document skew.

If the method of choice for capturing the final image is not digital, but uses film or another medium, the invention would also include a camera 50 which utilizes an analog image capture method and medium, such as photographic film, which is shown in FIG. 6.

In the embodiment within an analog image capture device using film or other media, the process would proceed as described above except an auxiliary digital image camera 40 would be used to detect skew angle 25 of the document leading edge 22. The field of view 45 of this auxiliary camera would be essentially the same as the field of view 55 of the analog camera. Since auxiliary image sensor 40 is used only to sub-sample images stored on temporary memory for determining skew angle, a low cost digital sensor could be used. When the skew angle requirements are satisfied, the analog image would then be captured to the media employed by analog image capture camera 50. All other activity would also follow the outline above.

The invention has been described in detail with particular reference to certain preferred embodiments thereof, but it will be understood that variations and modifications can be effected within the scope of the invention.

PARTS LIST

10. Document scanner
11. Document
12. Field of view of camera
13. Camera
14. Imaging sensor 15. Lens
16. Imaging circuit board assembly
17. Lens and imaging sensor support means
18. Transport means
19. Image memory device
20. Temporary memory device
22. Leading edge of document
24. Side edge of document
25. Document skew angle
28. Trailing edge of document
30. Rotation actuator mechanism
31. Actuator control electronics
32. Scanner processing unit
40. Auxiliary digital image sensor
45. Field of view of auxiliary digital image sensor
50. Analog image capture camera
55. Field of view of analog image capture camera

What is claimed is:

1. A method for correcting skew angle in a document scanner comprising:
   a1. transporting said document past a camera;
   b1. detecting a leading edge of said document;
   c1. determining a leading edge skew angle of said document using a first algorithm;
   d1. rotating said camera to align said camera with said document;
   e1. determining if said document is completely within a field of view of said camera;
   e2. stopping transport of said document if said camera is not aligned with said document when said document is completely within said field of view of said camera;
   f1. recalculate said skew angle based on entire document using a second algorithm;
   g1. if said skew angle is not within a predetermined tolerance, rotating said camera to align said camera with said document; and
   h1. capturing an image of said document when said document is completely within said field of view of said camera.

2. A method for correcting skew angle in a document scanner as in claim 1 comprising:
   i1. transporting said document out of said field of view of said camera.

3. A method for correcting skew angle in a document scanner as in claim 1 wherein said detection of said leading edge is accomplished by sub-sampling.

4. A method for correcting skew angle in a document scanner as in claim 3 wherein said sub-sampled image is stored to a temporary memory.

5. A method for correcting skew angle in a document scanner as in claim 1 wherein said camera utilizes an area sensor array as the imaging sensor.

6. A method for correcting skew angle in a document scanner as in claim 5 wherein said area sensor array is comprised of charged couple devices (CCD).

7. A method for correcting skew angle in a document scanner as in claim 5 wherein said area sensor array is comprised of complementary metal oxide semiconductor (CMOS).

8. A method for correcting skew angle in a document scanner as in claim 1 wherein said document is a sheet of paper.

9. A method for correcting skew angle in a document scanner as in claim 1 wherein said document is a photograph.

10. A method for correcting skew angle in a document scanner as in claim 1 wherein said document is a microfilm.

11. A method for correcting skew angle in a document scanner comprising:
    a1. transporting said document past a camera;
    b1. detecting a leading edge of said document;
    c1. determining a leading edge skew angle of said document using a first algorithm;
    d1. rotating said camera to align said camera with said document;
    e1. determining if said document is completely within a field of view of said camera;
    e2. stopping transport of said document if said camera is not aligned with said document when said document is completely within said field of view of said camera;
    e3. recalculating skew angle based on entire document using a second algorithm;
    e4. said skew angle is not within predetermined tolerance, rotating said camera to align said camera with said document;
    f1. capturing an image of said document when said camera is completely aligned with said document within said field of view of said camera; and
    g1. transporting said document out of said field of view of said camera.

12. A document scanner comprising:
    a camera for capturing an image of said document;
    a transport for moving said document past said camera;
    a sensor for detecting a leading edge of said document;
    a microprocessor which determines a leading edge skew angle of said document and if said document is completely within a field of view of said camera, based on a signal from said sensors said microprocessor stopping said transport of said document if said camera is not aligned with said document when said document is completely within said field of view of said camera; and
    a mechanism for rotating said camera to align said camera with said document.

13. A document scanner as in claim 12 wherein said digital camera utilizes an area sensor array.

14. A document scanner as in claim 13 wherein said sensor array is comprised of charged couple devices (CCD).

15. A document scanner as in claim 13 wherein said area sensor array is comprised of complementary metal oxide semiconductors (CMOS).

16. A document scanner as in claim 12 wherein said document is a sheet of paper.

17. A document scanner as in claim 12 wherein said document is a photograph.

18. A document scanner as in claim 12 wherein said document is a microfilm.

19. A method for correcting skew angle in a document scanner comprising:
    a1. transporting a document past a camera;
    b1. detecting a leading edge of said document;
    c1. determining a leading edge skew angle of said document based on said leading edge;
    d1. rotating said camera to align said camera with said document;
    e1. determining if said document is completely within a field of view of said camera;
    e2. stopping transport of said document if said camera is not aligned with said document when said document is completely within said field of view of said camera; and
    f1. capturing an image of said document when said document is completely within said field of view of said camera.

20. A method for correcting skew angle in a document scanner comprising:
- a1. transporting a document past a camera;
- b1. detecting a leading edge of said document with an auxiliary digital image sensor wherein said auxiliary sensor has a same field of view as said camera;
- c1. determining a leading edge skew angle of said document based on said leading edge;
- d1. rotating said camera and said auxiliary sensor to align said camera and said auxiliary sensor with said document;
- d2. determining if said document is completely within a field of view of said camera and said auxiliary digital image sensor;
- d3. stopping transport of said document if said camera and said auxiliary digital image sensor are not aligned with said document when said document is completely within said field of view of said camera and said auxiliary digital image sensor; and
- e1. capturing an image of said document when said document is completely within said field of view of said camera and said auxiliary digital image sensor.

21. A method for correcting skew angle in a document scanner as in claim 20 comprising:
- f1. transporting said document out of said field of view of said camera.

22. A method for correcting skew angle in a document scanner as in claim 20 wherein said document is an image on microfilm.

23. A method for correcting skew angle in a document scanner as in claim 20 wherein said camera is an analog camera.

24. A method for correcting skew angle in a document scanner as in claim 20 wherein said auxiliary sensor is comprised of charged couple devices (CCD).

25. A method for correcting skew angle in a document scanner as in claim 20 wherein said auxiliary sensor is comprised of complementary metal oxide semiconductors (CMOS).

26. A method for correcting skew angle in a document scanner as in claim 20 wherein said document is a sheet of paper.

27. A method for correcting skew angle in a document scanner as in claim 20 wherein said document is a photograph.

28. A document scanner comprising:
- a camera for capturing an image of said document;
- a transport for moving said document past said camera;
- an auxiliary sensor for detecting a leading edge of said document;
- a microprocessor which determines a leading edge skew angle of said document and if said document is completely within a field of view of said camera, based on a signal from said sensor, said microprocessor stopping said transport of said document if said camera is not aligned with said document when said document is completely within said field of view of said camera; and
- a mechanism for rotating said camera to align said camera with said document.

29. A document scanner as in claim 28 wherein said camera is an analog camera.

30. A document scanner as in claim 28 wherein said auxiliary sensor is comprised of charged couple devices (CCD).

31. A document scanner as in claim 28 wherein said auxiliary sensor is comprised of complementary metal oxide semiconductors (CMOS).

32. A document scanner as in claim 28 wherein said document is a sheet of paper.

33. A document scanner as in claim 28 wherein said document is a photograph.

34. A document scanner as in claim 28 wherein said document is a microfilm image.

* * * * *